Figure 1:
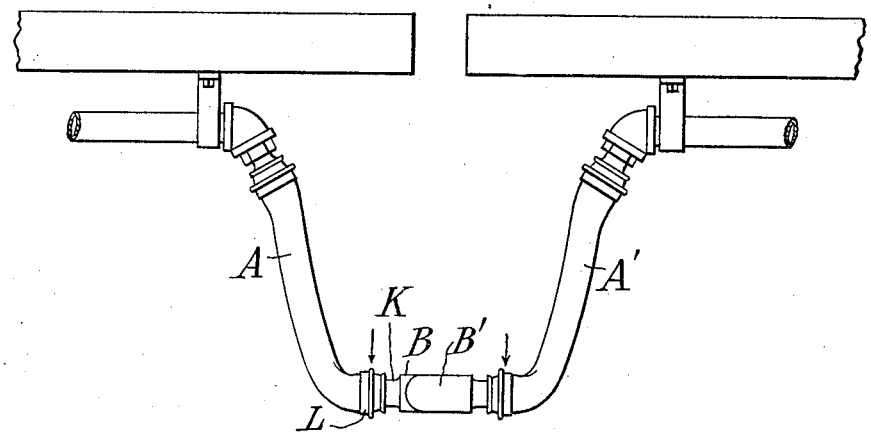

No. 837,558. PATENTED DEC. 4, 1906.
E. E. GOLD.
TRAIN PIPE COUPLING.
APPLICATION FILED NOV. 6, 1905.

2 SHEETS—SHEET 1.

WITNESSES:
Fred White
René Bruine

INVENTOR:
Edward E. Gold,
By Attorneys,
Arthur E. Fraser & Co.

THE NORRIS PETERS CO., WASHINGTON, D. C.

No. 837,558. PATENTED DEC. 4, 1906.
E. E. GOLD.
TRAIN PIPE COUPLING.
APPLICATION FILED NOV. 6, 1905.

2 SHEETS—SHEET 2.

WITNESSES:
Fred White
René Bruine

INVENTOR:
Edward E. Gold,
By Attorneys,
Arthur E. Fraser & Co

UNITED STATES PATENT OFFICE.

EDWARD E. GOLD, OF NEW YORK, N. Y.

TRAIN-PIPE COUPLING.

No. 837,558.      Specification of Letters Patent.      Patented Dec. 4, 1906.

Application filed November 6, 1905. Serial No. 285,994.

*To all whom it may concern:*

Be it known that I, EDWARD E. GOLD, a citizen of the United States, residing in the borough of Manhattan, city, county, and State of New York, have invented certain new and useful Improvements in Train-Pipe Couplers, of which the following is a specification.

This invention aims to provide certain improvements in train-pipe couplers of the general type in use. Such couplers are arranged to couple together by gravity, the two mating couplers being placed with their seats against each other while the ends of the hose are lifted and being then dropped and being locked by the dropping action. In end-port couplers the seats stand at substantially a right angle to the axes of the couplers, and when the parts are in the coupled position the axes or bodies of the couplers lie in a substantially horizontal position. The necks or equivalent provisions for fastening the couplers to the ends of the hose-sections extend in an upward direction at approximately the natural angle of the hose-sections, so as not to put any strain upon the latter and so that when the hose-sections are drawn taut and their meeting ends lifted the necks of the couplers will assume horizontal positions and the bodies will extend upward and will be disconnected from each other automatically. Side-port couplers have their seats upon the inner side faces in planes parallel with the axes of the couplers, and as far as the engagement of the seats is concerned it is immaterial at what angle the bodies of the couplers lie. Furthermore, side-port couplers are held together by the engagement of segmental projections, which are pressed together by a spring-pressure, so that when the couplers are pulled in an axial direction with sufficient strain they are separated by the riding of the projections over each other, the springs yielding to permit this. Therefore the angle at which such couplers shall lie is practically immaterial, and the necks are usually made in line with the axes or bodies of the couplers.

My present improvement is designed especially for couplers of which the pressure between the seats is dependent upon the external pressure (gravity or otherwise) which tends to press down the ends of the couplers—such, for example, as the well-known straight-port couplers—and utilizes the stiffness of the hose to increase this downward pressure upon the couplers. This result is effected by connecting the end of a coupler to the end of the hose at such an angle that in the running position—that is to say, when the coupled ends of the hose-sections are dropped between the cars—the end of the hose is bent upward above its normal angle. Thus in addition to the strain due to the natural curve of the hose there is a more or less sharp flexure of the lower end of the hose. The stiffness of the end of the hose thus tends to swing the coupler downward, and since the locking movement of the coupler is limited by its seat the seats of the couplers are thus pressed against each other in proportion to the stiffness of the hose and to the pressure of the steam or other fluid which tends to straighten out the hose.

With high steam-pressures there has been found in the old type of couplers a tendency of the couplers to lift under the action of the pressure within, causing a leakage of steam between the upper edges of the seats, the steam-pressure at the leak then tending to separate them further. Likewise with the old type of couplers there is a certain sudden lifting of the ends of the hose in going around a reverse curve or in striking obstructions on the track, and this lift has been found to occasionally separate the couplers. My present improvement therefore provides a safeguard against the partial opening of the couplers by the steam-pressure within and also against the separation of the couplers upon their being thrown up, since even in the upper position my improved couplers are not necessarily separated from each other, but their locking devices may be still in complete or nearly complete engagement, and the only difference is that the pressure due to the stiffness of the hose is not maintained.

The accompanying drawings illustrate embodiments of the invention.

Figure 2:
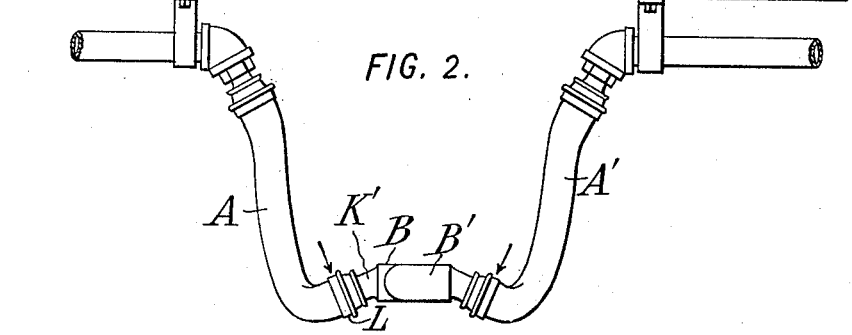
Figure 3:
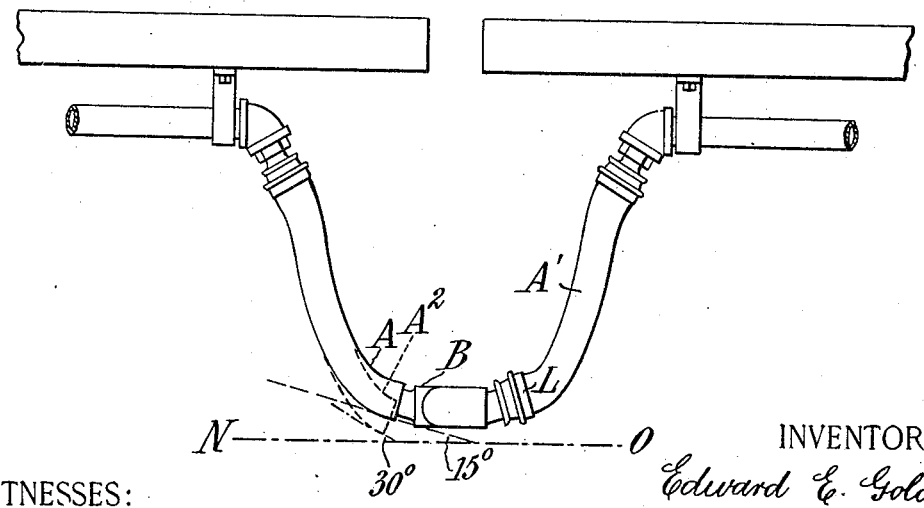
Figure 4:
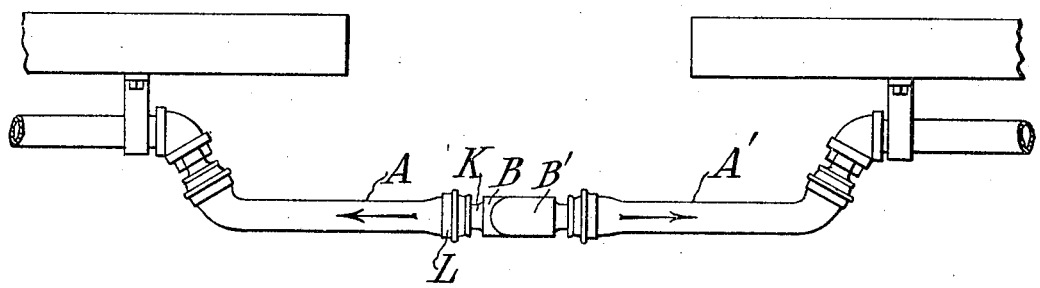
Figure 5:
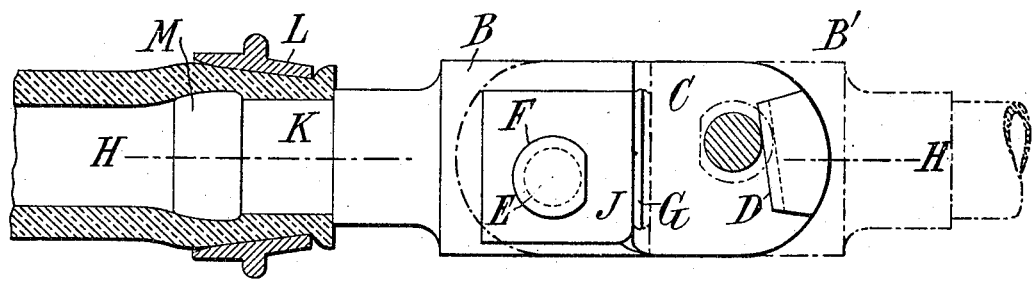

Figure 1 is an elevation of a pair of my improved couplers connected together with the hose in the running position. Figs. 2 and 3 are elevations of other forms of coupler with the parts in the same position. Fig. 4 is an elevation of the couplers of Fig. 1, showing the position assumed when the hose is taut. Fig. 5 is an enlarged view, partly in section, of a coupler and the connected end of the hose.

The hose-sections A A' depend from the ends of the train-pipes with sufficient slack to hang in approximately the position shown. In the couplers illustrated each of the couplers B B' is provided at one side with a locking-arm C, having an undercut portion D, and at the other side with a projection E, having also an undercut portion F, adapted to engage the portion D of the complementary coupler. The shapes of the portions D and F are such that when they are brought into engagement and the ends of the couplers are swung down the couplers are also drawn toward each other until the seats G firmly bear against each other, these seats being perpendicular to the axis H or to the body J. In the connected position of the couplers, therefore, the seats G lie in a vertical plane, and the axes H of the two couplers are in substantially a horizontal line. Two couplers in such a position being suspended at the meeting ends of the hose-sections, the natural tendency of the hose is to extend downward to the couplers. I propose, however, to connect it at such an angle that the end of the hose is bent upward out of its normal position. Then the natural tendency of the hose to assume a position of neutral equilibrium—that is to say, to lie in a catenary—assisted by the tendency of the internal steam-pressure to straighten out the hose puts a downward pressure upon the ends of the couplers, the amount of which depends upon the stiffness of the hose and the steam-pressure and in modern equipments is very large. Preferably the connection is made in such a way as to hold the ends of the hose-sections horizontally, so that when the hose is pulled taut the engagement of the locking projections will not be disturbed. The end of the hose, however, may be held at any angle below the angle which it would normally assume relatively to the axis of the coupler. For example, the pressure which it exerts may be made greater by bending the ends of the hose-sections upward, as in Fig. 2. Or the pressure may be comparatively little where the steam-pressure used is low. In such a case the angle of the end of the hose may be above the axis of the coupler, though still below the normal angle. Such a construction is illustrated in Fig. 3. At the left of this figure the connecting devices for the end of the hose are omitted for the sake of clearness, and the normal angle of the end of the hose is shown in dotted lines. $A^2$ represents the normal position, which ordinarily stands at an angle in the neighborhood of thirty degrees with the axis of the couplers or with a line N O parallel thereto. By connecting the end of the hose A with the coupler at an angle of, say, fifteen degrees, as illustrated, a considerable stress in the desired direction is obtained, which in practice I have found to be sufficient for lightweight couplers and low steam-pressures.

Ordinarily the hose is connected to the couplers by forcing the end of the hose over the neck K of the coupler and clamping it thereon in any suitable manner, as by a ring L, which squeezes the hose against a shoulder M upon the outside of the neck.

The horizontal position of the ends of the hose, as in Fig. 1, is obtained by arranging the necks K of the couplers horizontally or in line with the axes of the couplers. The upward angle of the ends of the hose, as in Fig. 2, is obtained by making the necks K' inclined downward from the bodies or axes of the couplers, and Fig. 3 vice versa.

By reason of my improvement it is possible to use a very light coupler even for very high pressure systems. For example, I may use a coupler weighing only half as much as couplers now used on railroads employing high pressures.

Though I have described with great particularity of detail certain specific embodiments of the invention, yet it is not to be understood therefrom that the invention is limited to the particular embodiments disclosed. Various modifications thereof in detail and in the arrangement and combination of the parts may be made by those skilled in the art without departure from the invention.

What I claim is—

1. The combination with a gravity train-pipe coupler, of a hose connected thereto at such an angle that in the coupled position the angle between the end of the hose and the axis of the coupler is below the normal angle so that there is a tendency to swing the end of the coupler downward, the plane of the seat of the coupler being transverse to the axis of the coupler, and the locking movement of said coupler being limited by its seat, whereby said seat is pressed against the seat of the complementary coupler by the hose.

2. The combination with a hose, of a gravity train-pipe coupler having a neck attached to the hose and extending from the body in a direction below the normal direction of the end of the hose in the coupled position, the plane of the seat of the coupler being transverse to the axis of the coupler, and the locking movement of said coupler being limited by its seat, whereby said seat is pressed against the seat of the complementary coupler by the hose.

3. A gravity train-pipe coupler having the plane of its seat transverse to its axis, and having its locking movement limited by its seat, whereby said seat is pressed against the seat of the complementary coupler by the hose, said coupler having a neck extending from its body at such an angle as to maintain the body in substantially the same locked position in all positions of the hose from the drooped running position to the taut horizontal position.

4. A gravity train-pipe coupler having the plane of its seat transverse to its axis, and having its locking movement limited by its seat, whereby said seat is pressed against the seat of the complementary coupler by the hose, said coupler having a neck for attachment to the hose and extending from the body in a direction below the natural direction of the end of the hose in the running position.

5. A gravity train-pipe coupler having the plane of its seat transverse to its axis, and having its locking movement limited by its seat, whereby said seat is pressed against the seat of the complementary coupler by the hose, said coupler having a locking-arm on one side and a locking projection on the opposite side, adapted to couple with its complementary coupler by a downward-swinging movement of the ends of the couplers and to uncouple by an upward-swinging movement of said ends, said coupler having a neck extending in a substantially horizontal direction, whereby the couplers are pressed against each other by the hose in the running position, and whereby when the hose is taut the couplers are still held in locking position.

In witness whereof I have hereunto signed my name in the presence of two subscribing witnesses.

EDWARD E. GOLD.

Witnesses:
 DOMINGO A. USINA,
 FRED WHITE.